Sept. 30, 1941.  A. GANCE ET AL  2,257,676
OPTICAL DEVICE FOR PHOTOGRAPHY
Filed Nov. 11, 1937

Inventors
Abel Gance and
Pierre Angenieux
By B. Singer, atty.

Patented Sept. 30, 1941

2,257,676

UNITED STATES PATENT OFFICE 2,257,676

OPTICAL DEVICE FOR PHOTOGRAPHY

Abel Gance, Neuilly-sur-Seine, and Pierre Angénieux, Paris, France

Application November 11, 1937, Serial No. 174,110
In France July 5, 1937

2 Claims. (Cl. 88—24)

The present invention has for its object improvements in optical devices for taking still pictures or motion pictures and relates in particular a device which enables the images of objects located at a plurality of different distances, for example close and distant objects, to be produced in the same picture with simultaneous sharpness of definition.

The invention consists in dividing the total field of the camera objective into a plurality of elementary fields or "zones" with respect to which the objects to be photographed are located in predetermined different planes, then in utilizing and in placing in front of the camera objective, an optical system formed by the juxtaposition of a plurality of elements such as lens elements each having its optical axis substantially coinciding with that of the objective and suitable for transferring to the same finite or infinite distance, the objects located in the aforesaid planes pertaining to each of the aforesaid zones, so as to ensure the simultaneous sharpness of definition of their images on the sensitive surface, a film for example.

When it is desired to obtain the simultaneous sharpness of definition of objects which are located at a plurality of given distances, the optical system of the invention will be formed by the juxtaposition of as many lens elements as it is desired to have different planes of sharpness, the convergent or divergent lens elements being located side by side and forming a single unit which is placed at some distance from the camera objective so as to embrace all or only a part of the field of said objective.

In the particular case in which, taking into account the depth of focus, it is desired to ensure the simultaneous sharpness of definition of the objects which are located in two planes only, the optical system of the invention can be reduced, in addition to the ordinary objective of the camera, to a single additional convergent or divergent lens through which the picture is taken for only a part of the field, whereas for the other part of the field the incident light will reach the objective directly by passing through a recessed portion provided in the additional lens.

The invention will moreover be better understood if reference is had to the accompanying drawing in which.

Figure 1:
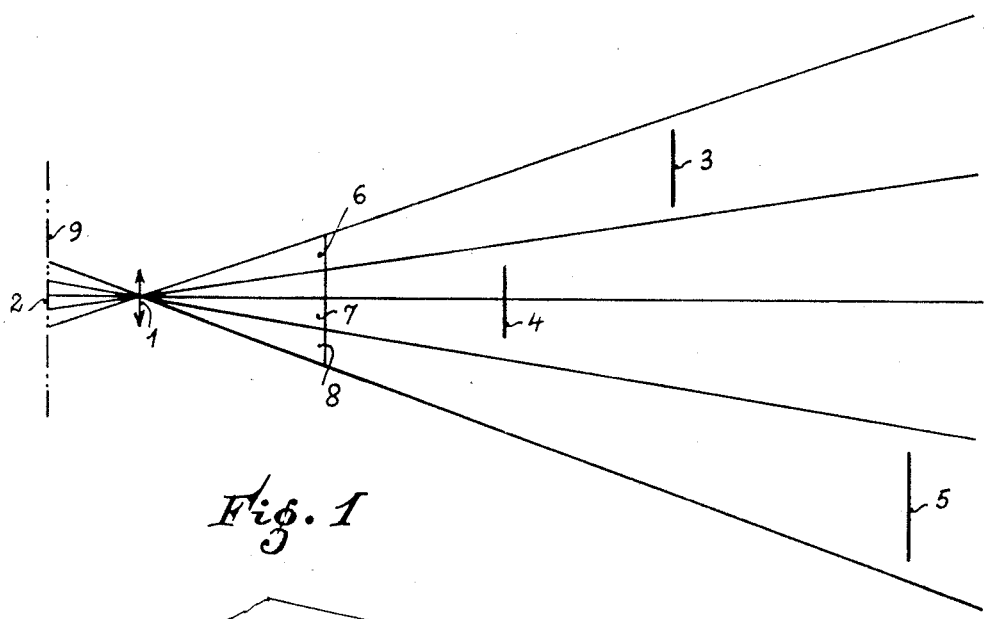
Fig. 1 is a diagrammatical view showing the principle of the invention.

Referring to Fig. 1, I is the photographic objective of which the focal plane 2 coincides with the emulsion 9 to be exposed; 3, 4 and 5 are objects located at different distances and of which it is desired to obtain a simultaneous sharpness of definition in the photograph. Finally, 6, 7 and 8 are convergent or divergent lens elements, the optical axis of each of which coincides with that of the objective I.

If the lens elements 6, 7 and 8 have focal lengths which are respectively equal to their distance from the objects 3, 4 and 5, it is perfectly obvious that the object 3, for example, which is contained in the field embraced by the element 6, will be optically transferred by the latter to infinity. The same will occur with the objects 4 and 5 by the action of the elements 7 and 8, and perfectly and simultaneously sharply defined images of the objects 3, 4 and 5 will thus be obtained in the plane 2.

It is quite obvious that if the objective I is displaced relatively to the plane 2, the focussing distances for each zone embraced by the elements 6, 7 and 8 will vary while remaining different from each other, and this has the effect of extending the field of application of an optical system such as the one formed by the group of elements 6, 7 and 8.

Similarly it is quite obvious that the lens elements 6, 7 and 8 can be wholly or partly divergent, that they may be of any number, that they may only cover a half or any portion of the field, the pictures being taken in the other portion without their assistance, finally that their area or their shape may be the same or different.

Figure 2:
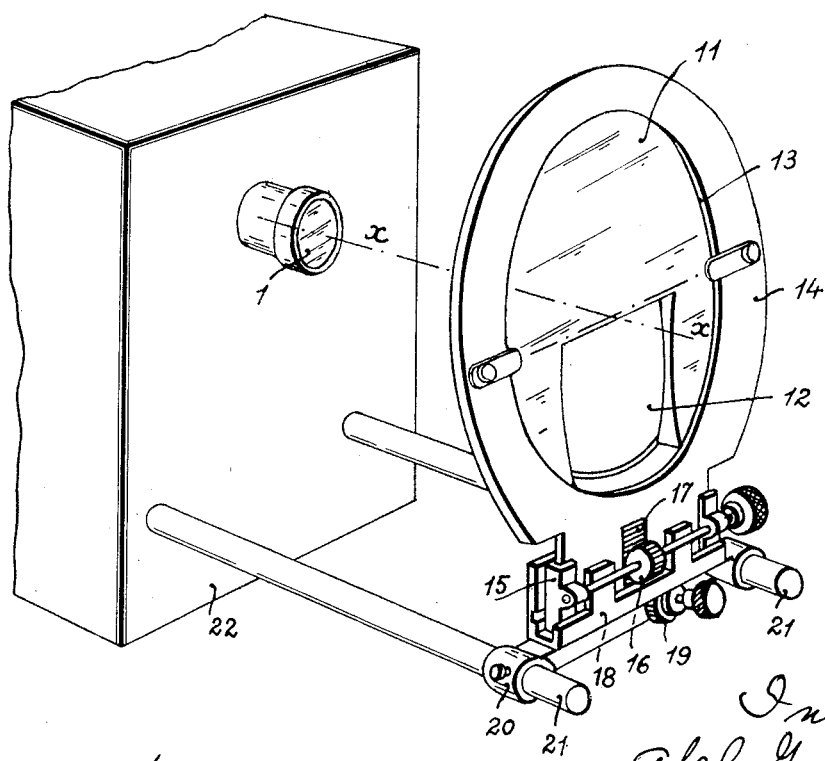
Fig. 2 shows a particularly simple embodiment of the invention.

A particularly simple embodiment is shown in Figure 2 in the case in which it is desired to obtain the simultaneous sharpness of definition of the objects located in only two different planes. In this case, the optical system of the invention which is placed at some distance from the camera objective I, can be formed by a single divergent lens II from which a portion I2 of rectangular or other shape has been cut away. For a part of the field, the pictures are therefore taken through the lens II, whereas for the other part of the field, the incident light reaches the objective I directly by passing through the cut away portion I2 provided in the lens II.

The sharpness of definition of the images on the film will therefore be obtained for two different distances of the objects which are in the field, according to whether said objects are in the part of the field embraced by the lens II or in the part of the field embraced by the rectangular recess I2 provided in said lens.

Furthermore, it is possible, by rotating the lens 11, to give same any position about its optical axis x—x, and it is also possible, by simple means, to displace said lens in its plane, for example by translation along two perpendicular axes, in such a manner that the operator can select at will the zone of the field which should correspond to the recess 12.

In the example illustrated, the setting 13 of the lens 11 is mounted, with the possibility of rotation, in the centre of a plate 14 which is supported by posts 21 which usually serve for fixing the sun-shield and which project outside the camera 22.

For this purpose, on said posts can slide two sleeves 20 braced by a cross-piece 19 which carries at the front a plate 18 and at the rear a similar counter-plate. Between these two plates can slide transversely and hosizontally a carriage 15 which is moved by a pinion 19 meshing with a rack cut in the under part of said carriage. The uprights of said carriage 15 in their turn form vertical slides between which can slide vertically the plate 14 which carries the lens setting 13, the vertical movement of the plate 14 being controlled by a pinion 16 carried by the carriage 15 and meshing with a rack 17 carried by the plate 14.

The displacements are therefore effected as follows:

1. Displacement of the mounting as a whole along posts for displacing the lens 11 along the axis x—x;
2. Lateral displacement of the carriage 15 by means of the pinion 19 for displacing the lens sideways;
3. Vertical displacement of the plate 14 by means of the pinion 16 for displacing the lens vertically;
4. Rotation of the lens 11 in the carrier-plate 14.

Of course, these particular means have only been given in a pursely indicative manner.

We claim:

1. Optical system for a camera having the usual objective, and enclosing a sensitive surface onto which the images are transmitted by said objective; comprising the combination with the camera objective, of additional optical photographic lenses located in the same plane in front of said objective and in cooperative relation thereto and each of whose optical axis coincides substantially with that of said objective, said additional lenses dividing the field of the objective into several elementary fields in which the objects to be photographed are located in different determined planes, the focal lengths of the said optical additional lenses being respectively equal to their distance from the respective objects to be photographed so that the respective objects to be photographed by means of said optical elements respectively will optically lie in the same plane, and means to adjust en masse said additional optical lenses toward and from the objective along the axis thereof and means to adjust said additional lenses en masse in two directions at right angles to one another in a plane normal to said optical axis for purposes described.

2. Optical system for a camera having the usual objective, and enclosing a sensitive surface onto which the images are transmitted by said objective; comprising the combination with the camera objective, of additional photographic lenses located in the same plane in front of said objective and in cooperative relation thereto and each of whose optical axis coincides substantially with that of said objective, said additional lenses dividing the field of the objective into several elementary fields in which the objects to be photographed are located in different determined planes, the focal lengths of the said additional lenses being respectively equal to their distance from the respective objects to be photographed so that the respective objects to be photographed by means of said optical elements respectively will optically lie in the same plane, means to adjust en masse said additional optical lenses toward and from the objective along the axis thereof, means to adjust said additional lenses en masse in two directions at right angles to one another in a plane normal to said optical axis for purposes described, said en masse adjusting means comprising posts projecting from the camera, a cross bar having end bearings slidable along said posts and means to secure said bearings in desired positions on said posts with respect to distance from the objective, a holder in which said lenses are mounted for rotation about a common axis parallel to the axis of the objective, a channel member mounted on said cross bar for adjustment along the same, means to effect said adjustment to move said lens holder transversely in its own plane, said lens holder being mounted in said channel member, and other means to raise and lower said plate.

ABEL GANCE.
PIERRE ANGÉNIEUX.